Patented Jan. 2, 1923.

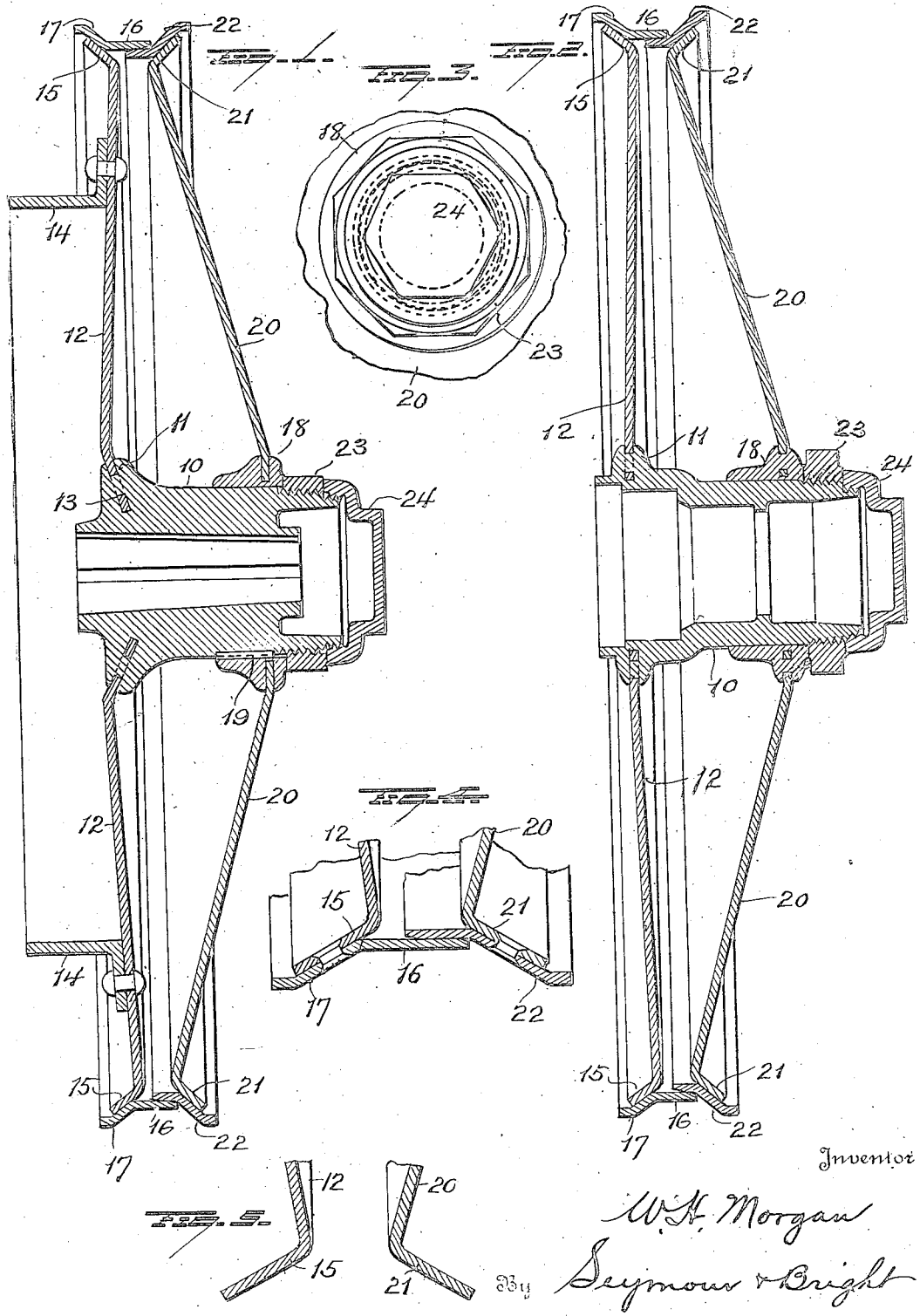

1,440,929

UNITED STATES PATENT OFFICE.

WILLIAM H. MORGAN, OF ALLIANCE, OHIO.

METAL WHEEL.

Application filed March 9, 1922. Serial No. 542,469.

*To all whom it may concern:*

Be it known that I, WILLIAM H. MORGAN, a citizen of the United States, and a resident of Alliance, in the county of Stark and State of Ohio, have invented certain new and useful Improvements in Metal Wheels; and I do hereby declare the following to be a full, clear, and exact description of the invention, such as will enable others skilled in the art to which it appertains to make and use the same.

My invention relates to metal wheels for vehicles, particularly those of the self propelled type employing demountable rims, and it consists in a wheel made of two sections, the hub section carrying the felly, and the other or removable section which is secured to the hub, constituting the outer member of the wheel and carrying a rim locking flange, the construction being such that the wheel can be adapted for any make of automobile or self propelled truck; can be readily and cheaply constructed and disassembled to remove a tire by simply removing the hub cap and a lock nut, the two parts constituting the body of the wheel being so shaped to provide for the greatest possible strength sidewise so as to prevent breakage or collapsing from side pressure such as centrifugal force in going around curves, skidding or being side swiped or side ditched all of which throw the major part of the weight of the car and its load sidewise on the wheels.

It further consists in the details of construction as will be more fully described and pointed out in the claims.

In the accompanying drawings; Figure 1 is a view in section of a rear or driving wheel embodying my invention; Figure 2 is a similar view of a front wheel; Figure 3 is an end view of the cap and lock nut; Figure 4 is a view showing a modification of the means for securing the felly and rim securing flange to the wheel member and Figure 5 is a view similar to Figure 4 with the parts 16 and 22 omitted.

10 represents the hub of a rear wheel, which is made of cast or forged metal and provided with a tapering bore adapted to be keyed to the driving axle in the usual and well known manner.

This hub is enlarged at its inner end and is provided with a peripheral flange 11 within which is secured the sheet metal disk 12, the disk having a central hole greater than the bore of the hub, and preferably bent inwardly as shown at 13 to provide for ample support for the center of the disk 13. This disk is preferably provided adjacent its center with a series of holes, shown in dotted lines in Figure 1 into which the metal of the hub enters during the operation of casting or forging the hub in order to solidly unite the disk and hub.

In the construction of the wheel, the sheet metal disk is placed within the mold and when the hub is poured, or cast, the metal of the latter enters the holes in the sheet metal disk and forms an integral structure.

If the hub be forged the disk 12 will be applied after the hub has been shaped or shaped sufficiently to receive the same.

The brake drum 14 is secured to the inner face of the disk 12 by rivets or otherwise, and the outer edge or periphery of the disk is inclined outwardly and upwardly as shown at 15 to form a seat for the felly 16 which may be either of sheet or cast metal as preferred. If made of cast metal, it is placed in the mold and united to the disk during the operation of casting the hub, but I prefer to make it of sheet metal and secure it on its inclined seat of the disk 12 by welding, or by riveting as shown in Figure 4.

This felly constitutes a seat for the rim and its inner edge is turned upwardly and inwardly as at 17 to form a retaining flange for the inner edge of the demountable rims.

The outer portion of the hub is made cylindrical to receive the cast or forged metal ring 18 which has a close, but longitudinally sliding fit on the hub, and is keyed to the latter as at 19 so as to turn therewith. The sheet metal disk 20 is provided with a central opening within which the ring 18 is secured by casting or forging, so as to constitute an integral part of the same, and is made dish shaped as shown in Figure 1, and provided at its periphery with an outwardly and upwardly turned flange 21 to receive and support the clamping ring for the demountable rim which is held in place by the outwardly and upwardly turned flange 21. This clamping ring 22 is made of sheet metal welded or riveted to the flange 21 and constitutes the outer flange to engage the outer edge of the demountable rim. The ring 22 is provided with a cylindrical portion which underlies the outer edge of the felly, the said cylindrical portion being of a length sufficient to provide for the necessary movement of the ring 22 to engage the outer edge of the felly and support the latter and bear with sufficient pressure on the rim to hold the latter in place irrespective of any slight irregularities in the shape or size of the latter.

Instead of employing a separate felly 16, and a separate clamping ring 22, the turned or inclined peripheries 15 and 21 may constitute the felly or seat for the rim as shown in Figure 5.

The hub of the rear or driving wheel is keyed to the axle in the well known and usual manner so that no change or alteration will be required in the car for which the wheels are designed and the outer or rim clamping section 18—20 and 22 is keyed to the hub, as at 19 for the purpose of positively driving the said outer or clamping section; preventing any independent rotary movement between the said parts and for adding strength and transmitting power from the axle to the tire.

The portion of the hub 10 on which the ring 18 is mounted, is as before stated, cylindrical so that the ring may have a free sliding movement thereon, and the ring is adjusted and held in place by the clamping or lock nut 23 which has a right hand thread, and the clamping or lock nut is held against movement by the screw cap 24 which is of the ordinary construction screwed to the extreme end of the hub, and is cup shaped to house the nut (not shown) which secures the hub on the axle.

The disk 12 which assists in carrying the felly is slightly dish shaped outwardly from the hub to the felly and the disk 20 of the outer section of the wheel has a greater inclination inwardly from the hub to the felly for the purpose of providing a wide base and also for adding lateral strength to the wheel and for preventing the disks from bending or collapsing under any shocks to which the tire may be subjected.

The wheel above described is the rear driving wheel. The front wheel shown in Figure 2 is identical with the latter except that it has no brake drum and the bore of the hub is constructed to rotate on the stub axles of the machine and is constructed to receive the roller bearings ordinarily employed.

The entire wheel is composed of but four parts including the nut and the cap, consequently it can be cheaply manufactured and assembled and when finished resemble the standard disk wheels now in use.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is:—

1. In a metal wheel, a metal hub, a sheet metal disk integrally secured to the hub and provided at its periphery with a flanged felly for the rim, a metal ring slidable on said hub, a disk integrally secured to the ring and provided at its outer edge with a clamping flange, and means for locking the ring to and adjusting it on the hub.

2. In a metal wheel, a metal hub, a sheet metal disk separate from but integrally secured to the hub, a sheet metal rim carrying felly at the periphery of the disk, a metal ring slidable on said hub, a sheet metal disk integrally secured to the ring and provided at its periphery with a rim clamping flange, and means for locking the ring to and adjusting it on the hub.

3. In a metal wheel, a metal hub, a sheet metal disk integrally secured to the hub, and provided at its periphery with a flanged felly for the rim, a metal ring slidable on said hub, a sheet metal disk integrally secured to said ring, a rim clamping flange rigid with the periphery of said last mentioned disk, and means for locking the ring on the hub.

4. In a metal wheel, a metal hub, a sheet metal disk separate from but integrally secured to the hub and provided at its periphery with an integral rim carrying felly having a peripheral flange, a metal ring slidable on said hub, a sheet metal disk integrally secured to said ring, a rim clamping flange integrally secured to the periphery of said latter disk and means for locking the ring on the hub.

5. In a metal wheel, a metal hub, a sheet metal disk integrally secured to the hub and provided at its periphery with a rim carrying felly and stop flange for the rim, a metal ring slidably mounted on the hub, a sheet metal disk integrally secured to the ring and provided at its periphery with a circular stop flange for the rim, the inner disk having an inclination from the hub outwardly and the outer disk having an inclination from the ring inwardly, and means for locking the said ring to the hub.

6. In a metal wheel, a cast metal hub, a sheet metal disk integral with the hub, the disk having an inwardly inclined periphery, a felly rigidly secured to said inclined periphery of the disk and provided with a peripheral rim supporting flange, a cast ring connected with the hub so as to turn therewith but slidable thereon, a sheet metal disk secured to the ring by casting the latter on the disk, the said latter disk having an outwardly inclined peripheral edge, a rim holding flange secured to said inclined edge, and adapted to cooperate with the flange on the felly and means for securing the ring to the hub.

In testimony whereof, I have signed this specification in the presence of two subscribing witnesses.

WILLIAM H. MORGAN.

Witnesses:
A. W. BRIGHT,
AUSTIN JAMES CLARE.